United States Patent
Aoyagi

(10) Patent No.: US 8,677,584 B2
(45) Date of Patent: Mar. 25, 2014

(54) COOLANT SUPPLY STRUCTURE FOR TURRET TOOL HEAD

(75) Inventor: Atsushi Aoyagi, Nagano (JP)

(73) Assignee: Citizen Machinery Miyano Co., Ltd., Kitasaku-gun, Nagano (JP)

( * ) Notice: Subject to any disclaimer, the term of this patent is extended or adjusted under 35 U.S.C. 154(b) by 381 days.

(21) Appl. No.: 13/138,639

(22) PCT Filed: Feb. 17, 2010

(86) PCT No.: PCT/JP2010/000989
§ 371 (c)(1),
(2), (4) Date: Sep. 20, 2011

(87) PCT Pub. No.: WO2010/106731
PCT Pub. Date: Sep. 23, 2010

(65) Prior Publication Data
US 2012/0006164 A1  Jan. 12, 2012

(30) Foreign Application Priority Data

Mar. 17, 2009  (JP) ................................. 2009-064547

(51) Int. Cl.
*B23B 29/24* (2006.01)
*B23B 29/12* (2006.01)

(52) U.S. Cl.
USPC ........... 29/39; 82/159; 82/50; 82/120; 407/11

(58) Field of Classification Search
USPC ........... 82/159, 120, 121, 50; 407/11; 408/35, 408/36; 29/35.5, 39, 42, 40
See application file for complete search history.

(56) References Cited

U.S. PATENT DOCUMENTS

| | | | | |
|---|---|---|---|---|
| 2,473,138 A | * | 6/1949 | Darash | 29/35.5 |
| 2,568,667 A | * | 9/1951 | Staples | 409/15 |
| 3,324,364 A | * | 6/1967 | Caruthers | 318/604 |
| 3,375,742 A | * | 4/1968 | Sturm | 82/159 |
| 7,509,720 B2 | * | 3/2009 | Wawrzyniak | 29/40 |

FOREIGN PATENT DOCUMENTS

| | | |
|---|---|---|
| JP | 2008-055576 | 3/2008 |
| JP | 2008-062315 | 3/2008 |
| JP | 2008-087089 | 4/2008 |
| WO | WO 2009/013912 | 1/2009 |

* cited by examiner

*Primary Examiner* — Will Fridie, Jr.
(74) *Attorney, Agent, or Firm* — Manabu Kanesaka

(57) ABSTRACT

To provide a coolant supply structure for a turret tool rest in which the central part of the intermediate shaft can be utilized effectively as a space and there is no need to allow this shaft to be hollow when a shaft such as a driving shaft is inserted. In a coolant supply structure for a turret tool rest to supply a coolant to a tool mounting part of a turret 12, which is provided in a turret tool rest 1 having a turret 12 with a tool T being mounted thereon, a hollow rotating shaft 15 for rotating the turret 12 and a hollow intermediate shaft 19 arranged within the rotating shaft 15, wherein the coolant supply structure has a cylindrical member 23 inserted into the intermediate shaft 19, and a space served as a passage 24 of the coolant is formed between the cylindrical member 23 and the intermediate shaft 19.

4 Claims, 2 Drawing Sheets

COOLANT SUPPLY STRUCTURE FOR TURRET TOOL HEAD

RELATED APPLICATIONS

The present application is National Phase of International Application No. PCT/JP2010/000989 filed Feb. 17, 2010, and claims priority from Japanese Application No. 2009-064547 filed Mar. 17, 2009, the disclosure of which is hereby incorporated by reference herein in its entirety.

TECHNICAL FIELD

The present invention relates to a coolant supply structure which supplies a coolant to a tool mounting part of a turret tool rest.

BACKGROUND ART

Conventionally, a turret tool rest having a hollow rotating shaft which rotates a turret on which a tool is to be mounted, a hollow intermediate shaft arranged within this rotating shaft, and a driving shaft of a rotating tool to be mounted on the turret has been known (see Patent Document 1, for example).

Further, in general, when processing a work by means of a tool mounted on a turret tool rest, a coolant is supplied to the tool mounting part of a turret on which the tool is mounted, and the coolant is supplied from the tool mounting part to the part of the work to be processed by means of the tool (see Patent Document 2, for example).

The supply structure of a coolant to the tool mounting part disclosed in Patent Document 2 has a configuration in which a coolant supply pipe inserted into the hollow driving shaft of the rotating tool is served as a coolant passage.

The above-mentioned coolant supply pipe has a defect that, since a coolant passes within the pipe, the central part of the intermediate shaft into which the coolant supply pipe is inserted cannot be effectively utilized as a space. Further, since the coolant supply pipe is required to be inserted into the innermost shaft, a shaft with the smallest diameter is required to be hollow.

RELATED ART DOCUMENTS

Patent Documents

Patent Document 1: JP-A-2008-55576
Patent Document 2: JP-A-2008-87089

Problems to be Solved by the Invention

The present invention has been made in view of the above-mentioned problems. An object thereof is to provide a coolant supply structure of a turret tool rest with a simple configuration which can supply a coolant to the tool mounting part of a turret and have a configuration in which the center part of an intermediate shaft can be utilized effectively as a space, and, when a shaft such as a driving shaft is inserted into an intermediate shaft, there is no need to allow this shaft to be hollow.

Means for Solving the Problem

In order to attain the above-mentioned object, the coolant supply apparatus of the present invention has a configuration that it is a coolant supply structure for a turret tool rest to supply a coolant to a tool mounting part of a turret, which is provided in a turret tool rest having a turret with a tool being mounted thereon, a hollow rotating shaft for rotating the turret and a hollow intermediate shaft arranged within the rotating shaft, wherein the coolant supply structure has a cylindrical member inserted into the intermediate shaft, and a space served as a passage of the coolant is formed between the cylindrical member and the intermediate shaft. The driving shaft of the rotating tool to be mounted on the turret may be inserted into the inside of the cylindrical member.

Due to such a configuration, since a coolant passes between the cylindrical member and the intermediate shaft, the central part of the intermediate shaft into which the cylindrical member is inserted can be effectively utilized as a space. Therefore, for example, the driving shaft of a rotating tool to be mounted on a turret can be provided in the central part of the intermediate shaft, and, at the same time, a solid shaft can be used as the driving shaft. Further, since there is no need to insert a coolant supply pipe or the like, the passage for a coolant to be supplied to the tool mounting part of a turret can be formed easily.

Further, the coolant supply structure for a turret tool rest according to the present invention may have a configuration in which a guide channel to guide a coolant to the tool mounting part is formed in the turret and an intercommunicating path to send the coolant from the passage to the guide channel is formed. The intercommunication path may be formed of a pipe or the like which is obtained by connecting the passage and the guide channel, or it may be formed in the intermediate shaft.

Due to the formation of the intercommunication path in the intermediate shaft, even if other constituting elements such as a rotating shaft are arranged in the vicinity of the tip of the driving shaft, a coolant passing the passage can be easily sent to the guide channel. As a result, a transmission shaft which transmits a driving force to the rotating tool can be rotatably provided in the intermediate shaft, and the transmission shaft can be arranged on one end of the driving shaft in the turret.

Advantageous Effects of the Invention

According to the present invention, not only the passage for a coolant to be supplied to the tool mounting part of a turret can be formed easily and the central part of the intermediate shaft can be effectively used as a space, but also this shaft is not needed to be hollow when inserting a shaft such as a driving shaft into the intermediate shaft.

Further, according to the coolant supply structure of the present invention, the cross section of a coolant passage can be increased as compared with the case where a coolant is supplied through a coolant supply pipe provided in the central part of the shaft, whereby a large amount of a coolant can be passed.

In addition, due to the provision of an intercommunication path, even in the case where other constituting elements such as other rotating shafts or moving bodies are arranged in the vicinity of the tip of the driving shaft, a coolant can be supplied to a predetermined tool mounting part.

MODE FOR CARRYING OUT THE INVENTION

Preferred embodiments of the present invention will be explained in detail with reference to the drawings.

Figure 1:
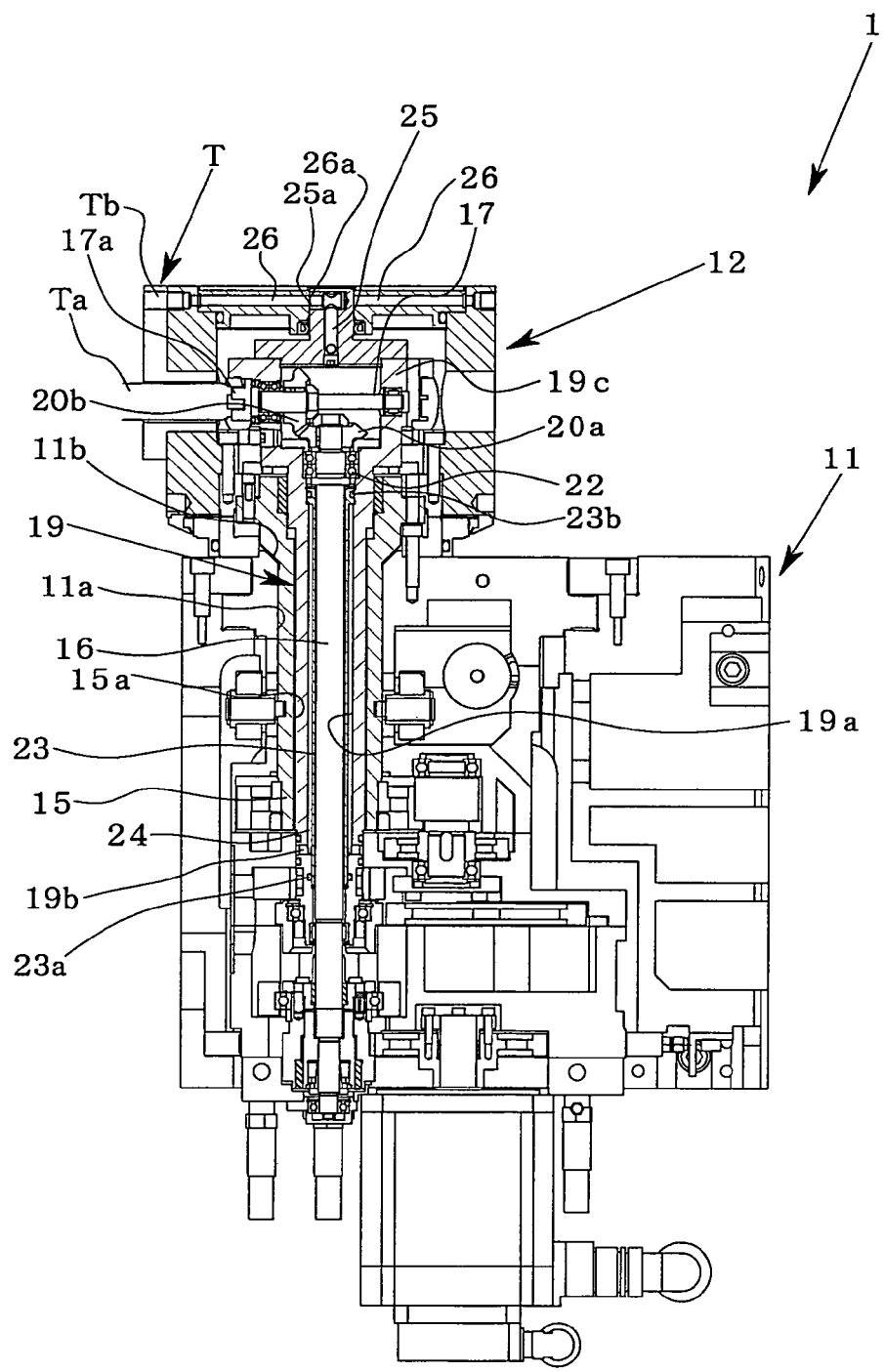
FIG. 1 is a front cross-sectional view of the coolant supply structure according to the first embodiment of the present invention, showing the configuration of a turret tool rest.
Figure 2:
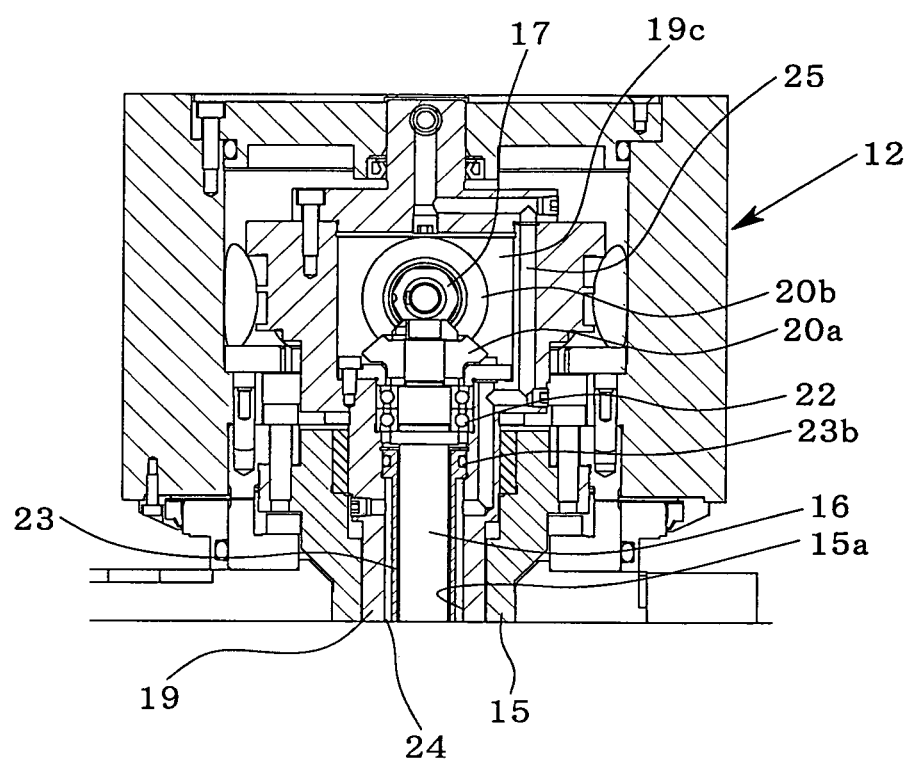
FIG. 2 is a lateral cross-sectional view of the turret of the turret tool rest shown in FIG. 1.

FIGS. 1 and 2 each show one embodiment of the coolant supply structure of the present invention, in which FIG. 1 is a front cross-sectional view explaining the configuration of the turret tool rest in this embodiment, and FIG. 2 is a lateral cross-sectional view of the turret of the turret tool rest shown in FIG. 1. In the following description, the upper side of each of FIG. 1 and FIG. 2 is stated as "upper" and the lower side of each of FIG. 1 and FIG. 2 is stated as "lower".

[Turret Tool Rest]

A turret tool rest 1 is provided with a tool rest main body 11 and a turret 12 which is supported by the tool rest main body 11 in an indexable and rotatable manner.

A supporting hole 11*a* is formed in the tool rest main body 11 in the vertical direction. In the supporting hole 11*a*, a hollow rotating shaft 15 which is rotatably supported by the tool rest main body 11 is inserted.

The turret 12 can mount a tool on each of a plurality of tool mounting parts formed on the peripheral surface and is provided at the upper end of the rotating shaft 15 such that the center of the indexing rotation is positioned on the rotation axis of the rotating shaft 15. Between the turret 12 and the tool rest main body 11, a positioning means 11*b* that positions and fixes the turret 12 at a predetermined rotation angle position is provided.

In this embodiment, since curvic couplings are used as the positioning means 11*b*, engagement of the curvic couplings is cancelled by moving the turret 12 up integrally with the rotating shaft 15. As a result, the rotating shaft 15 is driven by rotation to allow the turret 12 to rotate integrally with the rotating shaft 15. After the completion of the rotation, the turret 12 and the rotating shaft 15 are integrally lowered, and the curvic couplings are engaged to conduct positioning of the turret 12. As a result, the turret 12 is subjected to indexing rotation.

Into a through hole 15*a* of the rotating shaft 15, a hollow intermediate shaft 19 is inserted. The lower end of the intermediate shaft 19 is protruded from the lower end of the rotating shaft 15, and fixed on the tool rest main body 11. The upper end of the intermediate shaft 19 is protruded from the upper end of the rotating shaft 15, and reaches the upper end of the turret 12 within the turret 12. The upper end of the intermediate shaft 19 is formed as a transmission shaft supporting part 19*c*. A transmission shaft 17 is horizontally and rotatably supported by the transmission shaft supporting part 19*c*. At one end of the transmission shaft 17, an engagement part 17*a*, which can be releasably engaged with a shank part Ta of the tool T which is mounted on the tool mounting part which has been indexed at the processing position by the rotation of the turret 12, is formed.

Into a through hole 19*a* of the intermediate shaft 19, a driving shaft 16 is inserted concentrically with the rotating shaft 15. The lower end of the driving shaft 16 that is protruded from the lower end of the intermediate shaft 19 is rotatably supported by the tool rest main body 11. Further, the upper end of the driving shaft 16 is rotatably supported by a bearing 22 which is fitted to the through hole 19*a* of the intermediate shaft 19.

The above-mentioned transmission shaft 17 is located substantially right above the driving shaft 16. The transmission shaft 17 and the driving shaft 16 are connected through bevel gears 20*a* and 20*b*, and rotation of the driving shaft 16 is transmitted to the transmission shaft 17. Due to the indexing rotation of the turret 12, engagement of the shank part Ta of the rotation tool T of the tool mounting part which is currently indexed to the processing position and the engagement part 17*a* is canceled. By engagement of the shank part Ta of the rotation tool T of the tool mounting part which has subsequently been indexed to the processing position with the engagement part 17*a*, the rotation tool T which has been indexed is allowed to rotate via the transmission shaft 17 by rotation of the driving shaft 16, whereby processing of a work can be conducted.

[Coolant Supply Structure]

A plurality of guide channels 26 radially extending towards each of the tool mounting parts from the center of indexing rotation of the turret 12 are formed in the upper part of the turret 12. This guide channel 26 can be intercommunicated with a coolant hole Tb of the tool T which has been mounted on the tool mounting part. One end of the guide channel 26 is opened at a sliding contact surface at which the turret 12 slidably contacts the upper end of the intermediate shaft 19.

The driving shaft 16 is formed to have a diameter smaller than the inner diameter of the through hole 19*a* of the intermediate shaft 19. Between the driving shaft 16 and the inner peripheral surface of the through hole 19*a*, a gap is formed. In this gap, a cylindrical member 23 is provided such that it externally fits to the driving shaft 16. In this embodiment, a gap between the outer peripheral surface of the cylindrical member 23 and the inner peripheral surface of the through hole 19*a* forms a first coolant passage 24 as the passage of a coolant to be supplied to the guide channel 26.

In a position lower than the lower end of the rotating shaft 15, the lower end of the through hole 19*a* is formed as a hole part With a small diameter of which the inner diameter is almost similar to the outer diameter of the cylindrical member 23. Between the inner peripheral surface of the hole of this small-diameter-hole part and the outer peripheral surface of the cylindrical member 23, a sealing member 23*a* such as an O ring is provided in order to prevent leakage of the coolant. The upper end of the cylindrical member 23 which is positioned in the upper part in the through hole 19*a* is formed as a large-diameter-part of which the outer diameter is almost the same as the inner diameter of the through hole 19*a*. Between this large-diameter-part and the inner peripheral part of the through hole 19*a*, a sealing member 23*b* such as an O ring is provided in order to prevent leakage of the coolant.

In the intermediate shaft 19, in a position lower than the lower end of the rotating shaft 15, a hole 19*b* which is intercommunicated with a first coolant passage 24 is formed. A coolant of a coolant source provided outside the turret tool rest 1 is supplied to the first coolant passage 24 through this hole 19*b*.

In the intermediate shaft 19, a second coolant passage 25 as an intercommunication path is formed from the lower end to the upper end of the transmission shaft supporting part 19*c*. In a position lower than the sealing member 23*b*, this second coolant passage 25 is intercommunicated with the first coolant passage 24, thereby enabling a coolant which has been supplied from the first coolant passage 24 to be passed to the upper end of the intermediate shaft 19. The second coolant passage 25 has, in the above-mentioned sliding contact surface, an opening 25*a* in a direction opposing to an opening 26*a* of the guide channel 26.

Therefore, only the opening 26*a* of the guide channel 26 of the tool mounting part which has been indexed to the processing part conforms to the opening 25*a* of the second coolant passage 25. The second coolant passage 25 and the guide channel 26 are intercommunicated through the both openings 25*a* and 26*a*. Therefore, this coolant supply structure has a configuration in which a coolant which is to be supplied to the first coolant passage 24 through the hole 19*b* passes the first coolant passage 24 and the second coolant passage 25, flows in the guide channel 26 through the openings 25*a* and 26*a* of the above-mentioned sliding contact surface, and is supplied to the tool mounting part. The coolant is supplied from the guide channel 26 to the tool T mounted on the tool mounting part. Further, when indexing rotation of the turret 12 is conducted, the sliding contact surface of the turret 12 which slidably contacts the upper end of the intermediate shaft 19 closes the opening 25*a*, whereby leakage of a coolant from the second coolant passage 25 can be prevented.

Preferred embodiments of the present invention are explained hereinabove. However, the present invention is not limited to the above-mentioned embodiments.

For example, an explanation was made taking the case in which the rotational tool is horizontally mounted on the turret 12 as an example. However, the present invention can be applied to other turrets 12 on which the rotational tool is vertically or obliquely mounted.

In the above explanation, the first coolant passage 24 is a gap between the cylindrical member 23 and the intermediate shaft 19. The first coolant passage 24 may not be necessarily formed of a gap, and it may be formed of one or a plurality of grooves as far as it allows a coolant to be circulated.

Further, a coolant which has been supplied to the tool mounting part which has been indexed to the processing part may be sprayed from the tip of the tool to the processing part through the through hole of the tool T. The coolant may be sprayed from the nozzle provided in the tool mounting part to the processing part.

In the coolant supply structure of the present invention, it becomes possible to allow a large amount of a coolant to be passed as compared with the case when the coolant supply pipe arranged at the center of the shaft is used. Therefore, not only in the above-mentioned case where a coolant is supplied to one tool of one turret, but also, for example, in the case where a plurality of works are processed simultaneously by means of a plurality of tools mounted on one turret or a work is processed by a plurality of tools mounted on a plurality of turrets, it becomes possible to supply a coolant in an amount sufficient for the plurality of tools by a single coolant supply structure of a single turret.

INDUSTRIAL APPLICABILITY

The present invention can be widely applied to a machine tool such as a turret latche which supplies a coolant from a turret to a tool or the processing position of a work.

The invention claimed is:

1. A coolant supply structure for a turret tool rest to supply a coolant to a tool mounting part of a turret, which is provided in a turret tool rest having a turret with a tool being mounted thereon, a hollow rotating shaft for rotating the turret and a hollow intermediate shaft arranged within the rotating shaft, wherein the coolant supply structure has a cylindrical member inserted into the intermediate shaft, and a space served as a passage of the coolant is formed between the cylindrical member and the intermediate shaft.

2. The coolant supply structure for a turret tool rest according to claim 1, wherein a driving shaft of a rotating tool to be mounted on the turret is inserted into the inside of the cylindrical member.

3. The coolant supply structure for a turret tool rest according to claim 1, wherein a guide channel to guide a coolant to the tool mounting part is formed in the turret and an intercommunicating path to send the coolant from the passage to the guide channel is formed in the intermediate shaft.

4. The coolant supply structure for a turret tool rest according to claim 2, wherein a transmission shaft that transmits a driving force to the rotational tool is rotationally provided in the intermediate shaft, and the transmission shaft is arranged on one end of the driving shaft positioned in the turret.

\* \* \* \* \*